(12) United States Patent
Chen

(10) Patent No.: US 11,019,383 B2
(45) Date of Patent: May 25, 2021

(54) INTERNET ANTI-ATTACK METHOD AND AUTHENTICATION SERVER

(71) Applicant: WANGSU SCIENCE & TECHNOLOGY CO., LTD., Shanghai (CN)

(72) Inventor: Xionglin Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 284 days.

(21) Appl. No.: 16/083,204

(22) PCT Filed: Apr. 2, 2018

(86) PCT No.: PCT/CN2018/081561
§ 371 (c)(1),
(2) Date: Sep. 7, 2018

(87) PCT Pub. No.: WO2019/047513
PCT Pub. Date: Mar. 14, 2019

(65) Prior Publication Data
US 2020/0304853 A1    Sep. 24, 2020

(30) Foreign Application Priority Data
Sep. 5, 2017    (CN) .......................... 201710791391.7

(51) Int. Cl.
*H04N 21/258*    (2011.01)
*H04L 29/06*    (2006.01)
(Continued)

(52) U.S. Cl.
CPC ... *H04N 21/25816* (2013.01); *H04L 63/0236* (2013.01); *H04L 63/0884* (2013.01); *H04L 67/02* (2013.01); *H04N 21/2396* (2013.01)

(58) Field of Classification Search
CPC ......... H04N 21/25816; H04N 21/2396; H04N 21/2393; H04N 21/25808; H04N 21/5866;
(Continued)

(56) References Cited

U.S. PATENT DOCUMENTS

| 2003/0055990 A1* | 3/2003 | Cheline ............... H04L 63/0272 |
| | | 709/229 |
| 2004/0019801 A1* | 1/2004 | Lindholm ............... H04L 63/10 |
| | | 726/7 |

(Continued)

FOREIGN PATENT DOCUMENTS

| CN | 105530226 A | 4/2016 |
| EP | 1712975 A1 | 10/2006 |

OTHER PUBLICATIONS

The European Patent Office (EPO) The Extended European Search Report for 18803307.0 (PCT/CN2018/081561) dated Jun. 3, 2019 8 Pages.

*Primary Examiner* — Alexander Gee
(74) *Attorney, Agent, or Firm* — Anova Law Group, PLLC

(57) ABSTRACT

An Internet anti-attack method includes: an authentication server receives a service access request, sent by a user, from a content delivery network node group through a WEB interface, where the service access request includes an IP address of the user. The authentication server sends an access authentication request to a security gateway, where the access authentication request includes the IP address of the user, and the access authentication request is used to instruct the security gateway to allow a service-serving request that includes the IP address of the user to be sent to the service server.

11 Claims, 4 Drawing Sheets

(51) Int. Cl.
*H04L 29/08* (2006.01)
*H04N 21/239* (2011.01)
(58) Field of Classification Search
CPC ........... H04N 21/25875; H04N 21/441; H04N 21/475; H04N 21/4753; H04L 63/0236; H04L 63/0884; H04L 67/02
See application file for complete search history.

(56) References Cited

U.S. PATENT DOCUMENTS

| | | | | |
|---|---|---|---|---|
| 2005/0044225 | A1* | 2/2005 | Ota | H04L 29/06 709/225 |
| 2008/0276304 | A1* | 11/2008 | Maffione | H04L 67/1021 726/4 |
| 2016/0006719 | A1* | 1/2016 | Khalil | H04L 63/0815 726/8 |

* cited by examiner

INTERNET ANTI-ATTACK METHOD AND AUTHENTICATION SERVER

CROSS-REFERENCES TO RELATED APPLICATIONS

This application is a national phase entry under 35 U.S.C § 371 of International Application No. PCT/CN2018/081561 filed on Apr. 2, 2018, which claims priority of Chinese Patent Application No. 2017107913917, filed with the State Intellectual Property Office of P. R. China on Sep. 5, 2017, the entire contents of all of which are incorporated herein by reference.

FIELD OF THE DISCLOSURE

The present disclosure generally relates to the field of network security technology and, more particularly, relates to an Internet anti-attack method and an authentication server.

BACKGROUND

With the development of the Internet, there are more and more malicious attacks on the Internet. Attack modes, such as CC (Challenge Collapsar) attacks and traffic attacks, emerge one after another. Faced with various types of attacks, the traditional anti-attack methods use the Content Delivery Network (CDN) to hide the resource station Internet Protocol (IP) and use the distributed multi-node mode to handle attack traffic for protection. However, for some Internet services with special applications, because the resource station IP needs to be directly exposed to the users, there is no way to protect it by means of CDN. For Internet applications that cannot be protected with CDN, firewall technology may be used for protection. According to the defined security rules, the traditional firewall determines whether a request is an attack. If the request is an attack, the firewall blocks the access. If the request is not an attack, the request is granted, and the resource station responds normally. However, the traditional firewall defense rules are relatively inflexible, and thus the anti-attack capability is limited. Only some attacks can be identified and prevented. Other attacks, once entering a resource station, will require the resource station to evaluate and respond to these attacks, which pre-empts the resources of the resource station, thereby affecting the normal operation of the resource station.

BRIEF SUMMARY OF THE DISCLOSURE

The embodiments of the present disclosure provide an Internet anti-attack method and an authentication server, that are used to solve the problems including that some Internet services in the existing technologies cannot use the CDN for attack prevention and the traditional firewall has limited anti-attack capability due to the inflexible defense rules.

The embodiments of the present disclosure provide an Internet anti-attack method that includes:

receiving, by an authentication server, a service access request, sent by a user, from a content delivery network node group, where the service access request includes an IP address of the user; and sending, by the authentication server, an access authentication request to a security gateway, where the access authentication request includes the IP address of the user, and the access authentication request is used to instruct the security gateway to allow a service-serving request that includes the IP address of the user to be sent to a service server.

Optionally, the service access request is a request that has passed a verification by the content delivery network node group.

Optionally, the service access request includes verification information of the user, and before sending, by the authentication server, the access authentication request to the security gateway, the method further includes:

verifying, by the authentication server, the verification information of the user included in the service access request.

Optionally, the service access request is a login request, and the verification information is login information; or the service access request is a verification request, the verification information is a login success message, and the login success message is sent after a login server determines that the login request of the user has passed a verification.

Optionally, the authentication server receives the service access request sent by the user through a World Wide Web (WEB) interface.

The embodiments of the present disclosure provide an Internet anti-attack method that includes:

receiving, by a security gateway, an access authentication request sent by an authentication server, where the access authentication request includes an IP address of a user, and the IP address of the user is obtained from a service access request sent by the user; and after confirming that the authentication server has an access right, determining, by the security gateway, that the IP address of the user is an IP address that has a right to access a service server.

Optionally, the method further includes:

receiving, by the security gateway, a service-serving request sent by the user, where the service-serving request includes the IP address of the user; and after determining, by the security gateway, that the user has the right to access the service server based on the IP address of the user, allowing, by the security gateway, the service-serving request to be sent to the service server.

Correspondingly, the embodiments of the present disclosure provide an authentication server that includes:

a receiving module that is configured to receive a service access request, sent by a user, from a content delivery network node group, where the service access request includes an IP address of the user; and a processing module that is configured to send an access authentication request to a security gateway, where the access authentication request includes an IP address of the user, and the access authentication request is used to instruct the security gateway to allow a service-serving request that includes the IP address of the user to be sent to a service server.

Optionally, the service access request includes verification information of the user, and the processing module is further configured to:

before sending the access authentication request to the security gateway, verify the verification information of the user included in the service access request.

Optionally, the service access request is a request that has passed a verification by the content delivery network node group.

Optionally, the authentication server further includes:

a WEB interface that is configured to receive the service access request sent by the user.

The embodiments of the present disclosure provide a processor. The processor is configured to implement any of the above-described methods.

The embodiments of the present disclosure provide a computer storage medium. The computer storage medium stores computer-executable instructions that are configured to cause a computer to implement any of the above-described methods.

The above-described embodiments provide an Internet anti-attack method and an authentication server that include: the authentication server receives a service access request, sent by a user, from the content delivery network node group, where the service access request includes the IP address of the user; and the authentication server sends an access authentication request to the security gateway, where the access authentication request includes the IP address of the user, and the access authentication request is used to instruct the security gateway to allow the service-serving request that includes the IP address of the user to be sent to the service server. In the disclosed embodiments, the service access request is sent to the authentication server before the user sends the service-serving request to the service server. The authentication server verifies the verification information in the service access request and sends the IP address of the user in the service access request to the security gateway of the service server when it is determined that the verification information is legal. Therefore, instead of merely evaluating the service-serving request of the user based on predefined inflexible defense rules, the security gateway may evaluate the received service-serving request based on the IP address of the user sent by the authentication server, thereby improving the accuracy of the service-serving request evaluation and enhancing the anti-attack capacity. Since all the service-serving requests of the users need to pass the evaluation of the security gateway first before entering the service server, the attack traffic will not directly enter the resource station, thereby ensuring the normal operation of the resource station. Since the CDN technology is used to hide the IP address of the authentication server, directly attacking the authentication server IP from the attackers may be prevented. In addition, the CDN node group may verify the service access requests. Therefore, the anti-attack capability is improved. When making an anti-attack improvement, there is only a need to deploy a WEB service on the authentication server and set a WEB interface for the user requests. Therefore, the anti-attack deployment process is simplified, and the anti-attack improvement is easy to achieve.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings. It should be noted that the description of the specific embodiments is provided by way of interpretation, but not by way of limitation of the present disclosure.

Figure 1:
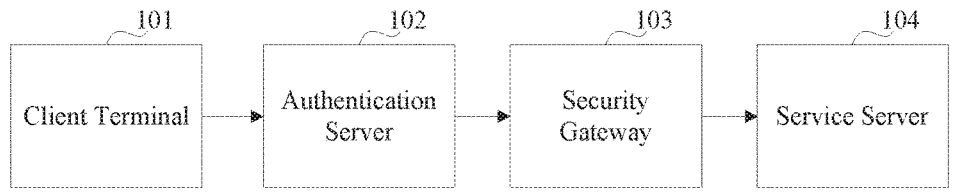
FIG. 1 is a schematic diagram of a system architecture according to some embodiments of the present disclosure.

FIG. 1 is a schematic diagram of a system architecture according to some embodiments of the present disclosure. As shown in FIG. 1, the system architecture includes a client terminal 101, an authentication server 102, a security gateway 103, and a service server 104. The client terminal 101 may be a user equipment (UE), a wireless communication device, an in-vehicle device, a wearable device, or the like. The security gateway 103 is a security gateway of the service server 104. The security gateway 103 may refer to a hardware firewall, a software firewall, a router, etc. The security gateway 103 may be set as a security gateway of a service server, as an upper-layer security gateway of multiple service servers, or as an ingress security gateway of a computer room where the service server resides. The authentication server 102 is connected with the client terminal 101 and the security gateway 103, and is configured to receive a service access request sent by the user, verify the service access request sent by the user, and send an access authentication request to the security gateway 103 after the verification is successful. After receiving the access authentication request sent by the authentication server 102, the security gateway 103 saves the IP address of the user included in the access authentication request in the local. The security gateway 103 is further connected with the client terminal 101, and is configured to receive a service-serving request sent by the user, and determine whether to allow the service-serving request from the user to be sent to the service server 104 based on the IP address of the user included in the service-serving request sent by the user and the IP address of the user sent by the authentication server 102. The service server 104 is connected with the security gateway 103 for receiving the service-serving request sent by the security gateway 103 and processing the service-serving request.

Figure 2:
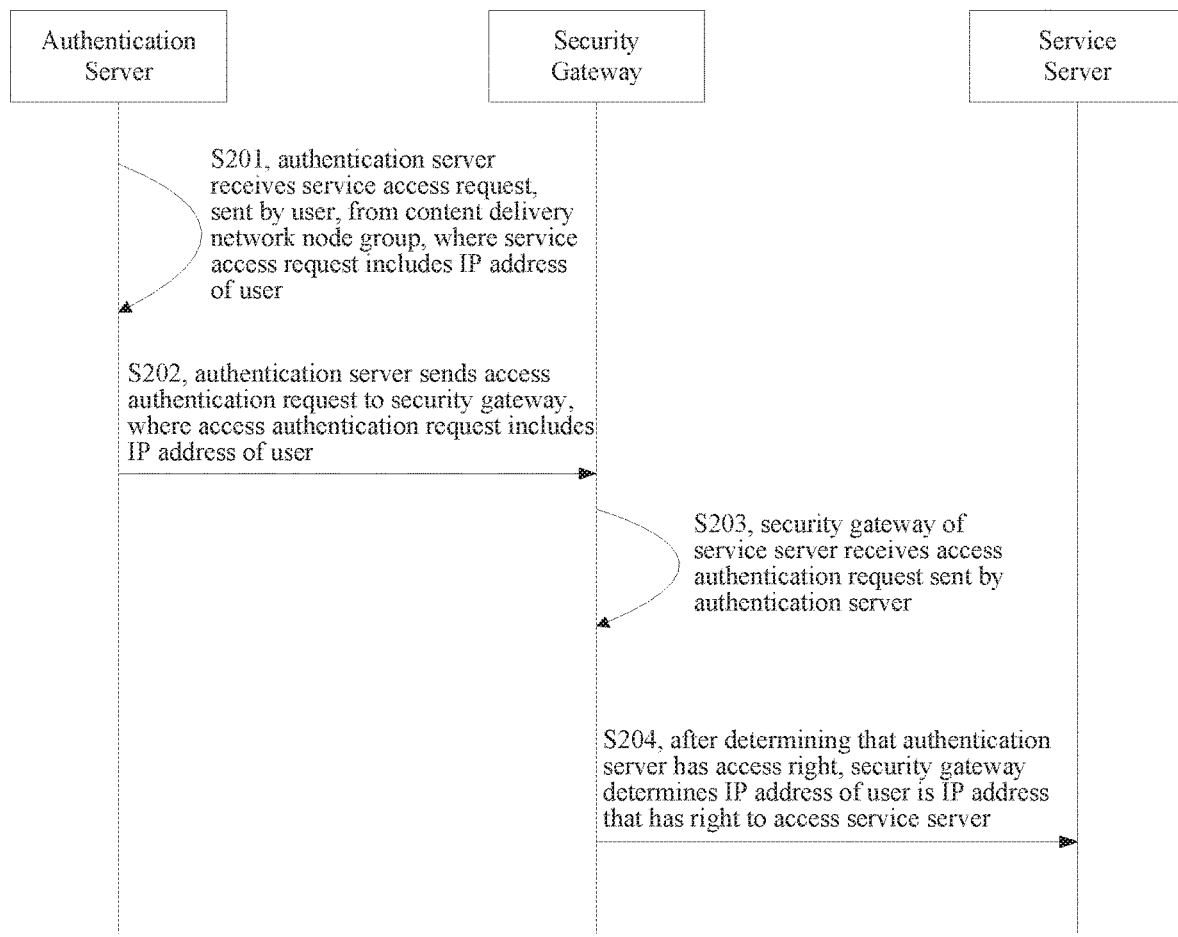
FIG. 2 is a flowchart of an Internet anti-attack method according to some embodiments of the present disclosure.

Based on the system architecture shown in FIG. 1, an Internet anti-attack method according to some embodiments of the present disclosure is shown in FIG. 2, which may include the following steps:

Step S201: the authentication server receives a service access request sent by the user from the content delivery network node group, where the service access request includes an IP address of the user.

Step S202: the authentication server sends an access authentication request to the security gateway, where the access authentication request includes the IP address of the user.

Step S203: the security gateway of the service server receives the access authentication request sent by the authentication server.

Step S204: after confirming that the authentication server has an access right, the security gateway determines that the IP address of the user is an IP address that has the right to access the service server.

In some implementations, a WEB service is deployed on the authentication server by setting a WEB service module. The service access request sent by the user is received from the content delivery network node group through a WEB interface in the WEB service module. The WEB interface may be embedded in the service flow of the service server, and the way of embedding the WEB interface may be diversified according to the characteristics of the services. For example, the WEB interface may be embedded in a place after the service server's login process. The specific process may be as follows: after the successful logic verification of a login process, a logic is added into the code, to allow the WEB service of the authentication server to be pushed in a Uniform Resource Locator (URL) format to a user for access. The security gateway may determine whether the authentication server has the access right based on the IP address of the authentication server or based on an access symbol that has been agreed with the authentication server by the security gateway. Take the IP address of the authentication server as an example: the security gateway of the service server may store in advance the IP address of the authentication server in a defined whitelist. The access authentication request sent by the authentication server also includes the IP address of the authentication server. When receiving the access authentication request sent by the authentication server, the security gateway first determines whether the IP address of the authentication server included in the access authentication request matches the IP address of the authentication server in the whitelist. If the two IP addresses match, it is then determined that the authentication server has the access right. The IP address of the user sent by the authentication server is then determined to be an IP address having the right to access the service server, and the IP address of the user is saved in the whitelist. In the disclosed embodiments, the service access request is sent to the authentication server before a user sends the service-serving request to the service server. After receiving the service access request sent by the user from the content delivery network node group, the authentication server sends the IP address of the user in the service access request to the security gateway of the service server. Accordingly, the security gateway may evaluate the received service-serving request based on the IP address of the user sent by the authentication server, instead of merely based on pre-defined inflexible defense rules, thereby improving the accuracy of the service-serving request evaluation and enhancing the anti-attack capability. The use of the CDN technology to hide the IP address of the authentication server prevents the attackers from directly attacking the authentication server IP, thereby improving the anti-attack capability. By deploying a WEB service on the authentication server and embedding the WEB interface into the service flow of the service server, the WEB interface may be used to receive the service access request sent by the user to achieve the anti-attack improvement, thereby simplifying the anti-attack improving process and enhancing the scalability.

Optionally, the service access request received by the authentication server is a request that has passed the verification by the content delivery network node group. The specific verification process may be as follows: a user sends the service access request to the CDN node group, the CDN node group receives the service access request sent by the user via a WEB-type interface, and determines whether the IP address included in the service access request sent by the user is an attack IP address based on a blacklist. If the IP address is not an attack IP address, the service access request sent by the user is sent to the authentication server. Here, the blacklist may be determined based on the number of times of user visits. When the number of times of user visits in a set time period is greater than a predefined threshold, the IP address of the user is added to the blacklist. It should be noted that the place for hiding the IP address of the authentication server is not limited to the CDN, and but may also include a proxy server, a shield-up service, a domain-oriented service, or the like, which are not limited by the disclosed embodiments. The technical solutions in the disclosed embodiments may be also applied to a scenario in which the service server cannot use a CDN. Since a user access request is not sent to the authentication server until the authentication of the access request by the CDN node group, the authentication server only sends the IP address of a normal user to the security gateway, thereby preventing the illegal users from attacking the service server through the security gateway. In addition, hiding the IP address of the authentication server in the CDN also prevents the attackers from attacking the authentication server, thereby improving the anti-attack capability.

Optionally, before sending an access authentication request to the security gateway, the authentication server verifies the verification information of a user included in the service access request. In actual implementations, the process of verifying the service access request sent by the user by the authentication server may include two situations, which will be described in the following with reference to specific implementations.

Implementation 1: The service access request sent by the user may be a login request, the authentication server is a login server, and the verification information is login information. Here, the login information may include a username, a password, a verification code, and the like. The user may log in through a client terminal or through a web page. The login information may be input by the user or obtained from the data (e.g., cookie) locally stored on the client terminal. In one implementation, after entering a login page, the user inputs the login information on the login page. The client terminal generates a login request based on the login information and sends the login request to the authentication server. Here, the login request includes the login information and the IP address of the user. After receiving the login request, the authentication server first verifies the login information in the login request based on the registration information saved when the user registers. When it is determined that the login information in the login request is legal, the authentication server sends an access authentication request to the security gateway of the service server, and also sends a post-successful login page to the user at the same time. Here, the access authentication request includes the IP address of the user.

Implementation 2: The service access request may be a verification request, and the verification information is a login success message. After a user successfully logs in to a third-party login server and obtains the login success message, the user sends a verification request to the authentication server. For example, a user selects the QQ® login in a third-party login mode on the login page, and enters the login information such as the QQ® account and password. The client terminal generates a login request based on the login information and sends the login request to a login server of Tencent®. The login server of Tencent® verifies the login information in the login request, and sends a login success message to the client terminal when the login information in the login request passes the verification. After receiving the login success message, the client terminal displays a post-successful login page, and sends a verification request to the authentication server at the same time. The verification request includes the login success message and the IP address of the user. After the receiving the verification request, the authentication server verifies the login success message included in the verification request. After determining that the login success message passes the verification, the authentication server sends an access authentication request to the security gateway of the service server, where the access authentication request includes the IP address of the user. It should be noted that, in the disclosed embodiments, the service access request is not limited to the login request or the verification request, but may include an implementation scenario that does not require a user to log in. For instance, the client terminal may achieve a user verification by sending the identification information that has been agreed with the authentication server.

Before sending a service-serving request from the user to the service server, the service access request from the user is first verified through the authentication server. The security gateway grants the service-serving request of the user until the service access request is determined to be legal. Therefore, the security gateway may effectively filter an attacker that does not send a service access request or whose service access request is illegal, thereby preventing a large amount of attack traffic from entering the service server. It should be noted that, in the disclosed embodiments, before sending the IP address of the user in the service access request to the security gateway, the authentication server may use only the CDN node group to verify the service access request, or use only the authentication server to verify the service access request, or first use the CDN node group to verify the service access request then use the authentication server to verify the service access request again. To select which of the above three implementation modes may vary and depend on specific situations.

Figure 3:
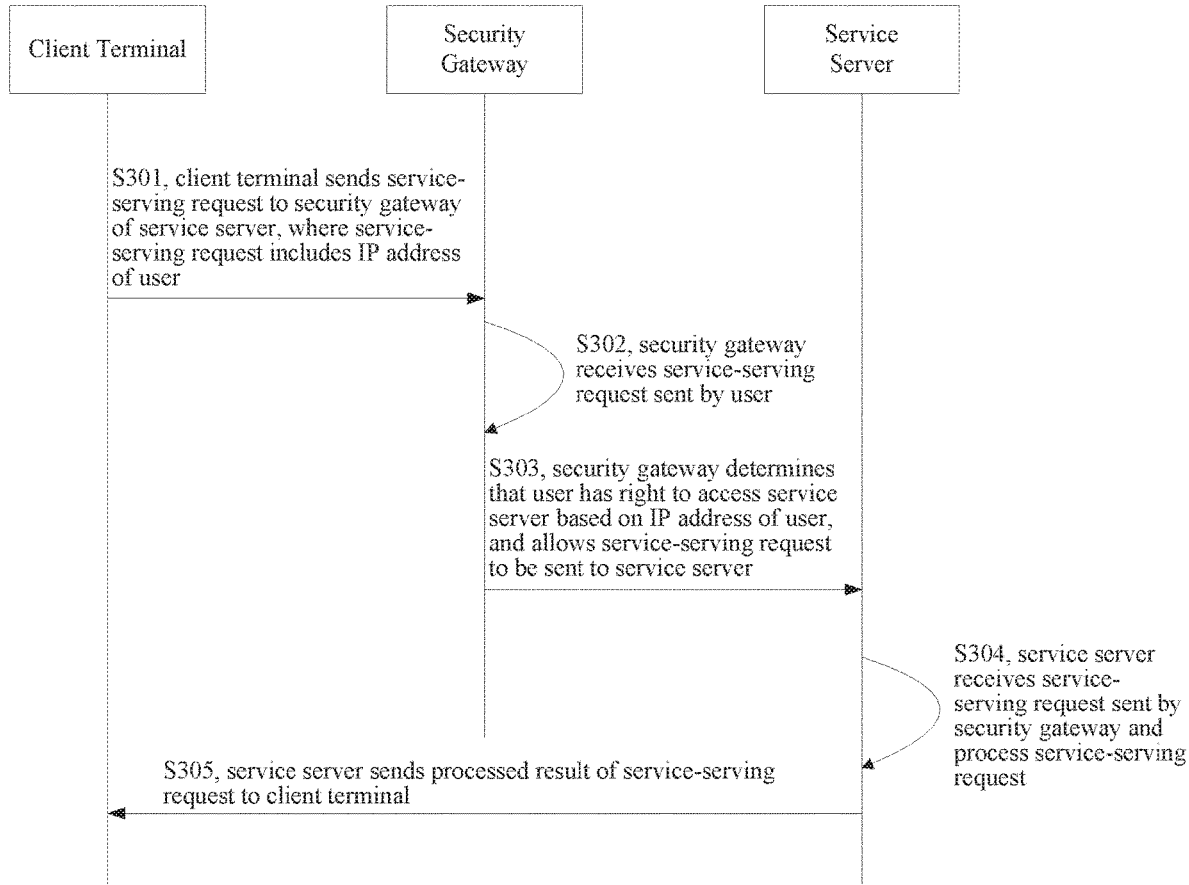
FIG. 3 is a schematic diagram of a service-serving request process according to some embodiments of the present disclosure.

Further, after the service access request sent by the user passes the verification (e.g., the user enters a post-successful login page after the successful login), the user may send a service-serving request to the service server based on the actual service requirement, as shown in FIG. 3. The specific steps may be as follows.

Step S301: the client terminal sends a service-serving request to the security gateway of the service server, where the service-serving request includes the IP address of the user.

Step S302: the security gateway receives the service-serving request sent by the user.

Step S303: after determining that the user has the right to access the service server based on the IP address of the user, the security gateway allows the service-serving request to be sent to the service server.

Step S304, the service server receives the service-serving request sent by the security gateway and processes the service-serving request.

Step S305, the service server sends the processed result of the service-serving request to the client terminal.

In some implementations, the security gateway may determine whether the user has the access right based on the whitelist. When receiving the service-serving request sent by the user, the security gateway first determines whether the IP address of the user included in the service-serving request matches the IP address of the user in the locally stored whitelist. If the two IP addresses match, it is then determined that the user has the right to access the service server, and the service-serving request of the user is allowed to be sent to the service server. Otherwise, the service-serving request of the user is not allowed. Since all the service-serving requests of the users need to pass the evaluation of the security gateway before entering the service server and the evaluation rules of the security gateway are determined after the authentication server verifies the service access request of the user, the accuracy of the security gateway evaluation is improved. This guarantees the service-serving requests of the normal users while also prevents the service-serving requests of the illegal attackers from entering the service server, thereby ensuring the normal operation of the service server.

Figure 4:
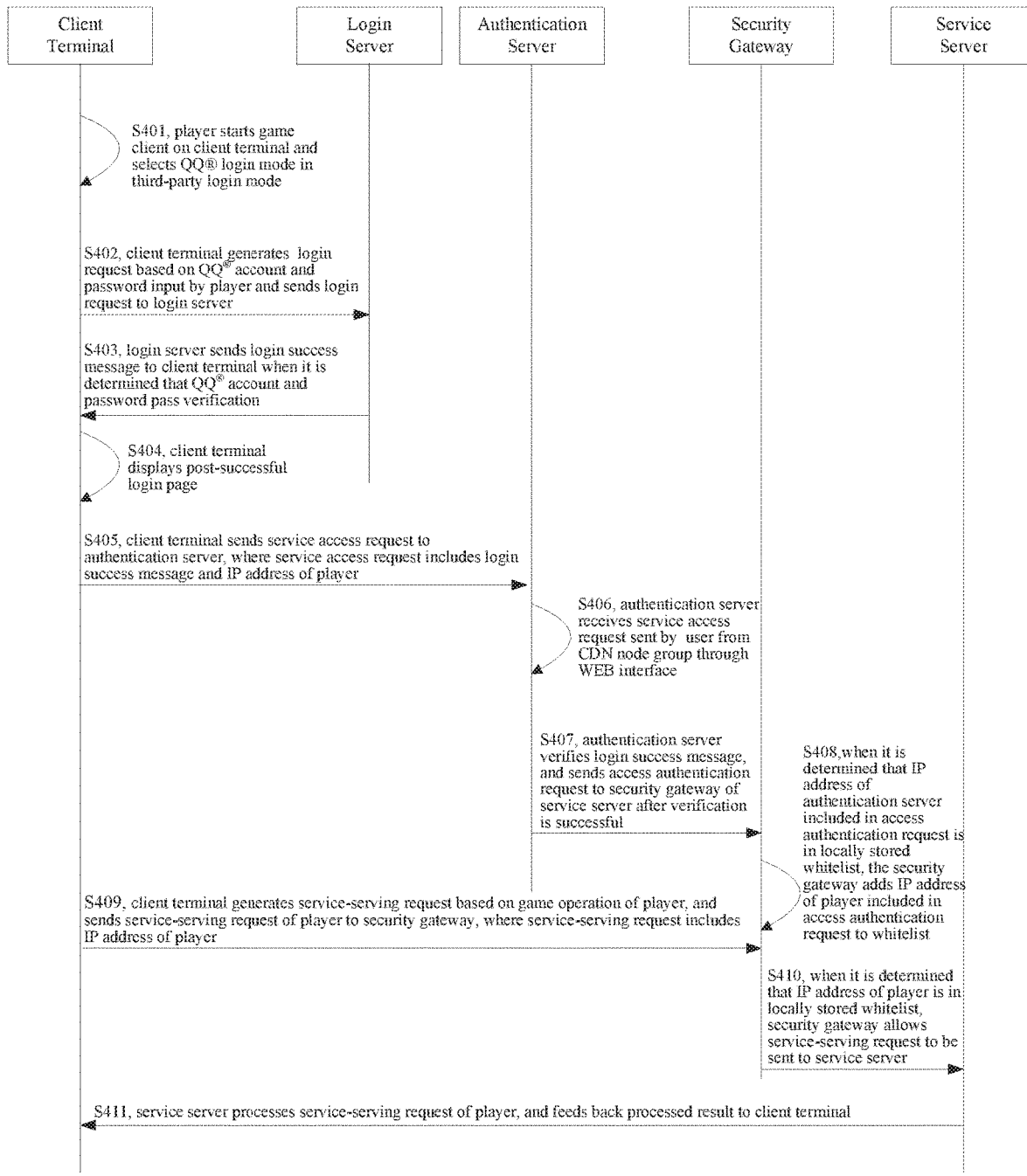
FIG. 4 is a flowchart of another Internet anti-attack method according to some embodiments of the present disclosure.

To better understand the disclosed embodiments, a flowchart of an Internet anti-attack method provided by the disclosed embodiments is made in detail with reference to a specific implementation scenario. For the interpretive purpose, take that a game player logs into a game page and plays games as an example. It should be noted that the disclosed embodiments are not limited to the scenario of playing games, but may include other scenarios, such as sending a mail, playing a video on demand, etc. Assume that the player uses the QQ® account to log into a game and play the game. Here, the login server is a server of Tencent®, and the authentication server and the service server are the servers of the game company. The specific process includes the following steps, as shown in FIG. 4.

Step S401: the player starts a game client on the client terminal and selects the QQ® login mode in the third-party login mode.

Step S402: the client terminal generates a login request based on the QQ® account and the password input by the player and sends the login request to the login server.

Step S403: the login server sends a login success message to the client terminal when it is determined that the QQ® account and the password pass the verification.

Step S404: the client terminal displays a post-successful login page.

Step S405: the client terminal sends an access authentication request to the authentication server, where the access authentication request includes the login success message and the IP address of the player.

Step S406: the authentication server receives the service access request sent by the user from the CDN node group through a WEB interface.

Step S407: the authentication server verifies the login success message, and sends an access authentication request to the security gateway of the service server after the verification is successful, where the access authentication request includes the IP address of the player and the IP address of the authentication server.

Step S408: when it is determined that the IP address of the authentication server included in the access authentication request is in the locally stored whitelist, the security gateway adds the IP address of the player included in the access authentication request to the whitelist. The security gateway may pre-populate the IP address of the authentication server into the whitelist and allow the authentication server to change the whitelist.

Step S409: the player enters the post-successful login page, performs a game operation based on the specific needs, and the client terminal generates a service-serving request based on the game operation of the player, and sends the service-serving request of the player to the security gateway, where the service-serving request includes the IP address of the player.

Step S410: when it is determined that the IP address of the player is in the locally stored whitelist, the security gateway allows the service-serving request to be sent to the service server.

Step S411: the service server processes the service-serving request of the player, and feeds back the processed result to the client terminal.

The above-described embodiments provide an Internet anti-attack method and an authentication server that include: the authentication server receives a service access request, sent by a user, from the content delivery network node group through the WEB interface, where the service access request includes the verification information of the user and the IP address of the user; the authentication server verifies the verification information of the user, and sends an access authentication request to the security gateway of the service server after the verification is successful, where the access authentication request includes the IP address of the user, and the access authentication request is used to instruct the security gateway to allow the service-serving request that includes the IP address of the user to be sent to the service server. In the disclosed embodiments, the service access request is sent to the authentication server before the user sends the service-serving request to the service server. The authentication server verifies the verification information in the service access request, and sends the IP address of the user in the service access request to the security gateway of the service server when it is determined that the verification information is legal. Therefore, instead of merely evaluating the service-serving request of the user based on predefined inflexible defense rules, the security gateway may evaluate the received service-serving request based on the IP address of the user sent by the authentication server, thereby improving the accuracy of the service-serving request evaluation and enhancing the anti-attack capacity. Since all the service-serving requests of the users need to pass the evaluation of the security gateway before entering the service server, the attack traffic will not directly enter the resource station, thereby ensuring the normal operation of the resource station. Since the CDN technology is used to hide the IP address of the authentication server, directly attacking the authentication server IP from the attackers may be prevented, thereby improving the anti-attack capability. When making an anti-attack improvement, there is only a need to deploy a WEB service on the authentication server and set a WEB interface for the user requests. Therefore, the anti-attack deployment process is simplified and the anti-attack improvement is easy to achieve.

Figure 5:
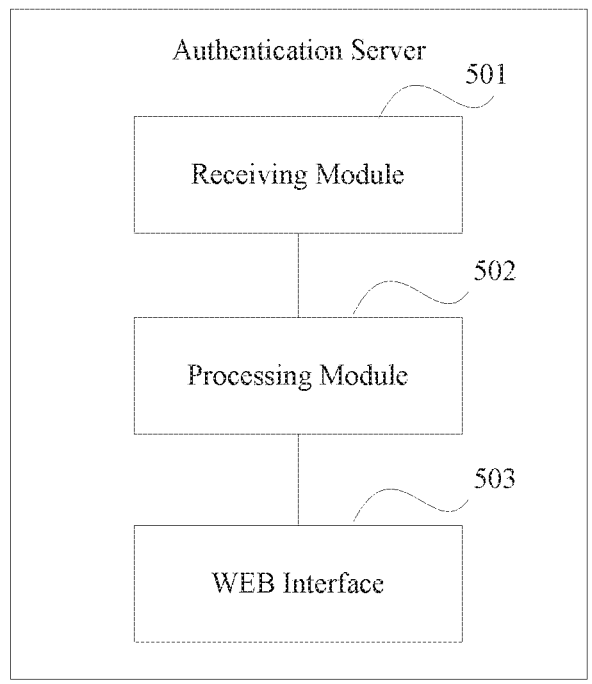
FIG. 5 is a schematic structural diagram of an authentication server according to some embodiments of the present disclosure.
Figure 6:
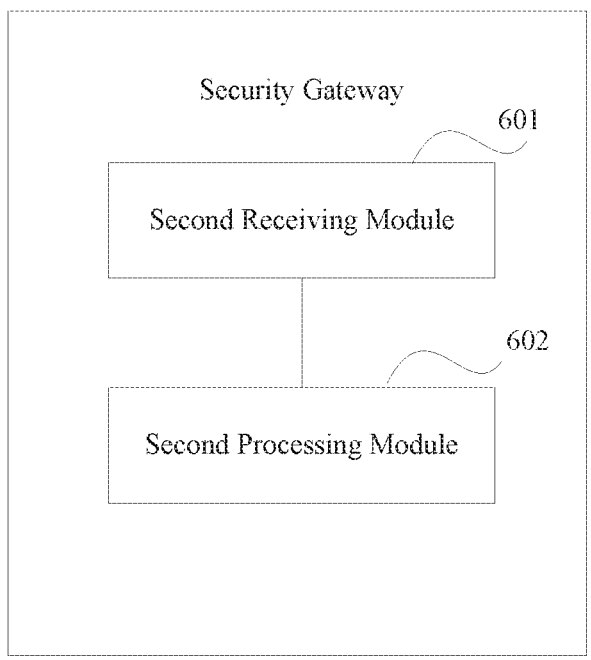
FIG. 6 is a schematic structural diagram of a security gateway according to some embodiments of the present disclosure.

Based on the similar technical concepts, the embodiments of the present disclosure further provide an authentication server, as shown in FIG. 5, that includes:

a receiving module 501 that is configured to receive, from a content delivery network node group, a service access request sent by a user that passes a verification by the content delivery network node group, where the service access request includes an IP address of the user; and a processing module 502 that is configured to send an access authentication request to a security gateway, where the access authentication request includes the IP address of the user, and the access authentication request is used to instruct the security gateway to allow a service-serving request that includes the IP address of the user to be sent to the service server.

Optionally, the service access request includes verification information of the user, and the processing module 502 is further configured to:

before sending the access authentication request to the security gateway, verify the verification information of the user included in the service access request.

Optionally, the authentication server further includes a WEB interface 503, where:

the WEB interface 503 is configured to receive the service access request sent by the user.

The embodiments of the present disclosure provide a computing device, which may be a desktop computer, a portable computer, a smartphone, a tablet computer, a personal digital assistant (PDA), or the like. The computing device may include a central processing unit (CPU), a memory, an input/output device, etc. The input device may include a keyboard, a mouse, a touch screen, etc., and the output device may include a display device, such as a liquid crystal display (LCD), a cathode ray tube (CRT), or the like.

The memory may include a read-only memory (ROM) and a random-access memory (RAM), and provide program instructions and data stored therein to the processor. In the disclosed embodiments, the memory may be used to store program instructions for the Internet anti-attack methods.

The processor may be configured to invoke the program instructions stored in the memory, and execute any of the above-described methods based on the obtained program instructions.

The embodiments of the present disclosure provide a processor. The processor is configured to execute any of the above-described methods.

The embodiments of the present disclosure provide a computer storage medium. The computer-readable storage medium stores computer-executable instructions that are configured to cause the computer to perform any of the above-described methods.

Correspondingly, the embodiments of the present disclosure provide a security gateway, comprising:

a second receiving module 601 that is configured to receive an access authentication request sent by the authentication server, where the access authentication request includes an IP address of the user, the access authentication request is sent from a service access request sent by the user, and the IP address of the user is obtained from the service access request; and a second processing module 602 that is configured to determine that the IP address of the user is an IP address that has the right to access the service server after it is determined that the authentication server has the access right.

Optionally, the second processing module 602 is further configured to:

receive a service-serving request sent by the user, where the service-serving request includes an IP address of the user; and allow the service-serving request to be sent to the service server after it is determined that the user has the right to access the service server based on the IP address of the user.

The embodiments of the present disclosure provide a computing device.

The computing device may be specifically a desktop computer, a portable computer, a smartphone, a tablet computer, a PDA, or the like. The computing device may include a CPU, a memory, an input/output device, etc. The input device may include a keyboard, a mouse, a touch screen, etc., and the output device may include a display device such as an LCD, CRT, etc.

The memory may include a ROM and a RAM and provide program instructions and data stored therein to the processor. In the disclosed embodiments, the memory may be used to store program instructions for the Internet anti-attack methods.

The processor may be configured to invoke the program instructions stored in the memory and execute any of the above-described methods based on the obtained program instructions.

The embodiments of the present disclosure provide a processor. The processor is configured to execute any of the above-described methods.

The embodiments of the present disclosure provide a computer storage medium. The computer storage medium stores computer-executable instructions that are configured to cause the computer to implement any of the above-described methods.

Those skilled in the art will appreciate that the embodiments of the present disclosure may be implemented as a method or a computer program product. Accordingly, the present disclosure may take the form of an entire hardware implementation, an entire software implementation, or a combination of software and hardware implementations. Moreover, the present disclosure may take the form of a computer program product implemented on one or more computer-usable storage media (including but not limited to a disk storage device, CD-ROM, or an optical storage device) having computer-executable program code embodied therewith.

The present disclosure has been described with reference to the flowcharts and/or block diagrams of methods, apparatuses (systems), and computer program products of the disclosed embodiments. It will be understood that each flow and/or block of the flowcharts and/or block diagrams and combinations of flows and/or blocks of the flowcharts and/or block diagrams may be implemented by the computer program illustrations. These computer program instructions may be provided to a general purpose computer, a special purpose computer, an embedded processing device, or a processor of another programmable data processing device to form a machine. Through implementing the instructions by a computer or a processor of another programmable data processing device, a device for implementing functions specified by one or more flows of the flowcharts and/or one or more blocks of the block diagrams may be formed.

The computer program instructions may be also stored in a computer-readable storage device that can direct a computer or another programmable data processing device to operate in a specific manner, so that the instructions stored in the computer-readable storage device may cause a generation of a product containing an instructing device. The instructing device implements the functions specified by one or more flows of the flowcharts and/or one or more blocks of the block diagrams.

The computer program instructions may also be loaded onto a computer or another programmable data processing device, to allow a series of operational steps to be performed on the computer or other programmable data processing device to achieve the computer-implemented processes. Accordingly, instructions implemented on a computer or another programmable data processing device are configured to achieve steps of functions specified by one or more flows of the flowcharts and/or one or more blocks of the block diagrams.

Although the present disclosure has been described with reference to the preferred embodiments, those skilled in the art, upon understanding the basic inventive concepts, may make other modifications and variations to these embodiments. Accordingly, the appended claims are intended to cover the preferred embodiments and any of the modifications and variations that fall within the scope of protection of the present disclosure.

It will be apparent that those skilled in the art may make various modifications and variations to the present disclosure without departing from the spirit and scope of the present disclosure. Accordingly, it is intended that these modifications and variations, if falling within the scope of the claims or their equivalents of the present disclosure, should still be covered by the present disclosure.

What is claimed is:

1. An Internet anti-attack method, comprising:
sending, by a user, a service access request to a content delivery network node group, wherein the service access request includes an IP address of the user;
sending, by the content delivery network node group, the service access request that has passed a verification by the content delivery network node group to an authentication server; and
sending, by the authentication server, an access authentication request to a security gateway, wherein the access authentication request includes the IP address of the user and one of an IP address of the authentication server and an access symbol that has been agreed with the authentication server by the security gateway, and the access authentication request is used to instruct the security gateway to allow a service-serving request that includes the IP address of the user to be sent to a service server after confirming that the authentication server has an access right;
wherein confirming that the authentication server has the access right further includes:
determining, by the security gateway, whether the authentication server has the access right based on one of the IP address of the authentication server and the access symbol that has been agreed with the authentication server by the security gateway.

2. The method according to claim 1, wherein the service access request includes verification information of the user, and before sending, by the authentication server, the access authentication request to the security gateway, the method further includes:
verifying, by the authentication server, the verification information of the user included in the service access request.

3. The method according to claim 2, wherein:
the service access request is a login request, and the verification information is login information; or
the service access request is a verification request, the verification information is a login success message, and the login success message is sent after a login server determines that the login request of the user has passed a verification.

4. The method according to claim 1, wherein the authentication server receives the service access request sent by the user through a World Wide Web (WEB) interface.

5. An Internet anti-attack method, comprising:
sending, by a user, a service access request to a content delivery network node group, wherein the service access request includes an IP address of the user;
sending, by the content delivery network node group, the service access request that has passed a verification by the content delivery network node group to an authentication server;

receiving, by a security gateway, an access authentication request sent by the authentication server, wherein the access authentication request includes the IP address of the user and one of an IP address of the authentication server and an access symbol that has been agreed with the authentication server by the security gateway, ;and after confirming that the authentication server has an access right, determining, by the security gateway, that the IP address of the user is an IP address that has a right to access a service server;

wherein confirming that the authentication server has the access right further includes:

determining, by the security gateway, whether the authentication server has the access right based on one of the IP address of the authentication server and the access symbol that has been agreed with the authentication server by the security gateway.

6. The method according to claim 5, further comprising:

receiving, by the security gateway, a service-serving request sent by the user, wherein the service-serving request includes the IP address of the user; and after determining, by the security gateway, that the user has the right to access the service server based on the IP address of the user, allowing, by the security gateway, the service-serving request to be sent to the service server.

7. An authentication server, comprising a processor, the processor is configured to:

receive a service access request, sent by a user, from a content delivery network node group, wherein the service access request includes an IP address of the user and the service access request is a request that has passed a verification by the content delivery network node group; and send an access authentication request to a security gateway, wherein the access authentication request includes an IP address of the user and one of an IP address of the authentication server and an access symbol that has been agreed with the authentication server by the security gateway, and the access authentication request is used to instruct the security gateway to allow a service-serving request that includes the IP address of the user to be sent to a service server after confirming that the authentication server has an access right wherein confirming that the authentication server has the access right further includes:

determining, by the security gateway, whether the authentication server has the access right based on one of the IP address of the authentication server and the access symbol that has been agreed with the authentication server by the security gateway.

8. The authentication server according to claim 7, wherein the service access request includes verification information of the user, and the processor is further configured to:

before sending the access authentication request to the security gateway, verify the verification information of the user included in the service access request.

9. The authentication server according to claim 7, further comprising:

a WEB interface that is configured to receive the service access request sent by the user.

10. The method according to claim 1, before sending, by the authentication server, the access authentication request to the security gateway, the method further includes:

verifying the service access request first by the content delivery network node group; and verifying the service access request again by the authentication server.

11. The method according to claim 5, wherein the service access request is a request that has passed a verification by one or more of a content delivery network node group and the authentication server.

* * * * *